(12) United States Patent
Choi et al.

(10) Patent No.: US 9,246,171 B2
(45) Date of Patent: Jan. 26, 2016

(54) CATHODE ACTIVE MATERIAL, AND CATHODE AND LITHIUM BATTERY INCLUDING THE MATERIAL

(71) Applicant: Samsung SDI Co., Ltd., Yongin-si, Gyeonggi-do (KR)

(72) Inventors: Byung-jin Choi, Seoul (KR); Jae-gu Yoon, Suwon-si (KR); Myung-hoon Kim, Seoul (KR); Jin-hwan Park, Seoul (KR); David Keogh, San Diego, CA (US); Steven Kaye, San Diego, CA (US); Wei Tong, San Diego, CA (US)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 14/050,459

(22) Filed: Oct. 10, 2013

(65) Prior Publication Data

US 2014/0103252 A1    Apr. 17, 2014

(30) Foreign Application Priority Data

Oct. 11, 2012    (KR) ........................ 10-2012-0113041

(51) Int. Cl.
| | |
|---|---|
| *H01M 4/505* | (2010.01) |
| *H01M 4/525* | (2010.01) |
| *C01G 51/00* | (2006.01) |
| *C01G 45/12* | (2006.01) |
| *C01G 53/00* | (2006.01) |
| *H01M 4/131* | (2010.01) |
| *H01M 10/0525* | (2010.01) |

(52) U.S. Cl.
CPC .............. *H01M 4/505* (2013.01); *C01G 53/50* (2013.01); *H01M 4/525* (2013.01); *C01G 45/1228* (2013.01); *C01G 45/1235* (2013.01); *C01G 51/50* (2013.01); *C01G 51/54* (2013.01); *C01G 53/54* (2013.01); *C01P 2002/50* (2013.01); *C01P 2002/52* (2013.01); *H01M 4/131* (2013.01); *H01M 10/0525* (2013.01); *Y02E 60/122* (2013.01); *Y02T 10/7011* (2013.01)

(58) Field of Classification Search
None
See application file for complete search history.

(56) References Cited

U.S. PATENT DOCUMENTS

| | | | |
|---|---|---|---|
| 2003/0170540 A1* | 9/2003 | Ohzuku | H01M 4/13 429/231.1 |
| 2006/0286445 A1 | 12/2006 | Nishino et al. | |
| 2009/0194734 A1* | 8/2009 | Arimoto | C01G 45/1228 252/182.1 |

FOREIGN PATENT DOCUMENTS

| | | | |
|---|---|---|---|
| CN | 101453018 A | | 6/2009 |
| CN | 101521272 | * | 9/2009 |
| CN | 102354741 A | | 2/2012 |
| CN | 102881891 | * | 1/2013 |
| CN | 103337615 | * | 10/2013 |
| JP | 2001-148249 A | | 5/2001 |

OTHER PUBLICATIONS

Kim et al. Synthesis and electrochemical behavior of Li[Li0.1Ni0.35-x/2CoxMn0.55-x/2]O2 cathode materials. Solid State Ionics 164 (2003) 43-49.*

Ding et al., "Effect of rare earth elements doping on structure and electrochemical properties of LiNi1/3Co1/3Mn13O2 for lithium-ion battery", Solid State Ionics (2007), 178(13-14), 967-971.

* cited by examiner

*Primary Examiner* — Tanisha Diggs
(74) *Attorney, Agent, or Firm* — Lee & Morse, P.C.

(57) ABSTRACT

A cathode active material including a lithium metal oxide represented by Formula 1:

$$Li[Li_xMe_yM'_z]O_{(2+d)} \quad \text{Formula 1}$$

wherein $x+y+z=1$, $0<x<0.33$, $0<z\leq0.1$, and $0\leq d\leq0.1$, Me is at least one metal selected from Mn, V, Cr, Fe, Co, Ni, Al, and B, and M' is at least one metal selected from Sc, Y, and La.

11 Claims, 2 Drawing Sheets

CATHODE ACTIVE MATERIAL, AND CATHODE AND LITHIUM BATTERY INCLUDING THE MATERIAL

CROSS-REFERENCE TO RELATED APPLICATIONS

This application claims priority to and the benefit of Korean Patent Application No. 10-2012-0113041, filed on Oct. 11, 2012, and all the benefits accruing therefrom under 35 U.S.C. §119, the content of which is incorporated herein in its entirety by reference.

BACKGROUND

1. Field

The present disclosure relates to cathode active materials, and cathodes and lithium batteries including the cathode active materials.

2. Description of the Related Art

As a cathode active material for a lithium battery, a transition metal compound or an oxide of these transitional metal compounds and lithium, such as $LiNiO_2$, $LiCoO_2$, $LiMn_2O_4$, $LiFePO_4$, $LiNi_xCo_{1-x}O_2$ ($0 \leq x \leq 1$), or $LiNi_{1-x-y}Co_xMn_yO_2$ ($0 \leq x \leq 0.5$, $0 \leq y \leq 0.5$), is used.

$LiCoO_2$ is relatively expensive and has a limited capacity of about 140 milliampere-hours per gram (mAh/g). In addition, when a charging voltage of $LiCoO_2$ is increased to 4.2 volts (V) or more, 50% of the lithium is removed to be present in the form of $Li_{1-x}CoO_2$ ($x > 0.5$) in a battery. $Li_{1-x}CoO_2$ ($x > 0.5$) is structurally unstable and during charging and discharging, a capacity thereof substantially decreases.

A cathode active material, such as $LiNi_xCo_{1-x}O_2$ ($x=1, 2$) or $LiNi_{1-x-y}Co_xMn_yO_2$ ($0 \leq x \leq 0.5$, $0 \leq y \leq 0.5$), has low structural stability at high voltage.

Accordingly, there is a need to develop a cathode active material having high capacity and having improved structural stability at high voltage to prevent a decrease in discharging voltage, leading to an increase in lifetime characteristics.

SUMMARY

Provided is a cathode active material substituted with a heteroatom.

Also provided is a cathode including the cathode active material.

Also provided is a lithium battery including the cathode.

Additional aspects will be set forth in part in the description which follows and, in part, will be apparent from the description, or may be learned by practice of the presented embodiments.

According to an aspect, a cathode active material includes a lithium metal oxide represented by Formula 1:

Formula 1 wherein $x+y+z=1$, $0<x<0.33$, $0<z \leq 0.1$, and $0 \leq d \leq 0.1$, Me is at least one metal selected from Mn, V, Cr, Fe, Co, Ni, Al, and B, and M' is at least one metal selected from Sc, Y, and La.

According to another aspect, the cathode includes the cathode active material.

According to another aspect, a lithium battery includes the cathode.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
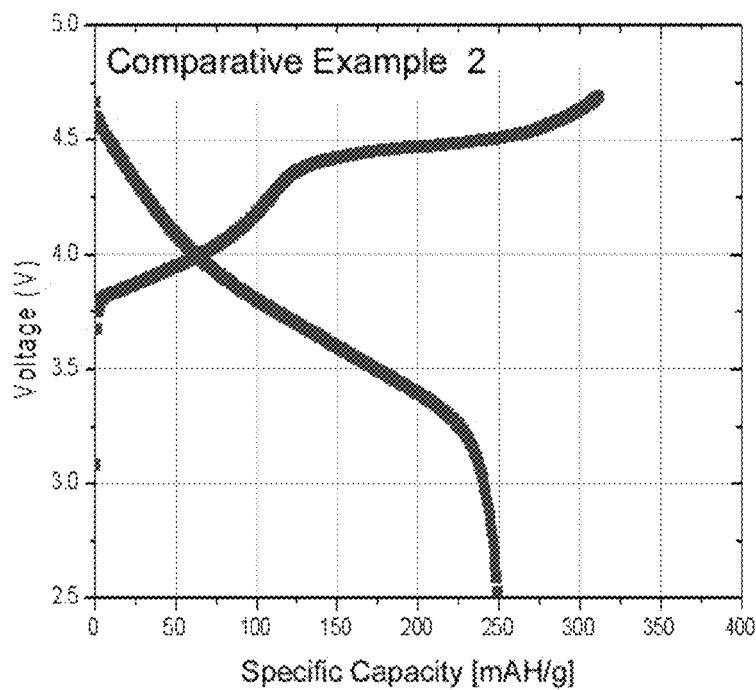
FIG. 1 is a graph of voltage (Volts, V) versus specific capacity (millampere-hours per gram, mAh/g) and shows a charging and discharging curve of a lithium battery of Comparative Example 2 in a $1^{st}$ cycle.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A lithium metal oxide, such as $Li[Li_xM'_{1-x}]O_2$ (x>0, M' is a plurality of transition metal), has a theoretical electric capacity of 250 to 280 mAh/g and thus, provides an increased electric capacity. However, structural stability of the lithium metal oxide containing excess lithium decreases at high voltage and thus, a discharging voltage decreases dramatically and lifetime characteristics decrease. Disclosed are lithium metal oxides which comprise an additional metal and which provide improved performance.

Hereinafter, an embodiment of a cathode active material, a cathode including the cathode active material, and a lithium battery including the cathode are described in further detail.

A cathode active material according to an embodiment includes a lithium metal oxide of Formula 1:

Formula 1 wherein x+y+z=1, 0<x<0.33, 0<z≤0.1, and 0≤d≤0.1, Me is at least one metal selected from Mn, V, Cr, Fe, Co, Ni, Al, and B, and M' is at least one metal selected from Sc, Y, and La.

The lithium metal oxide according to an embodiment is obtained by additionally doping a lithium metal oxide that includes overlithiated $Li_x$, a first metal (Me), and a second metal (M' or M"), and may have improved structural stability. A lithium battery including a lithium metal oxide with the improved structural stability may prevent a decrease in discharging voltage during charging and discharging and may have improved lifetime characteristics.

While not wanting to be bound by theory, grounds for the improvement in structural stability of the lithium metal oxide are to be described in further detail below. Thus the grounds are presented herein only to help understanding and shall not limit the scope of the present disclosure.

Due to the additional doping with a second metal (M' or M"), some Me of a $Li_2MeO_3$ phase, which is presumed to be present in the lithium metal oxide of Formula 1, are substituted with M' or M". The substitution may lead to an improvement in structural stability of the lithium metal oxide of Formula 1 at high voltage. For example, during charging at a high voltage of 4.4V or more with respect to lithium, a $Li_2MnO_3$ phase may be oxidized into a $MnO_2$ phase, generating oxygen, and during discharge, the $MnO_2$ phase is reduced into $LiMnO_2$ phase, not into $Li_2MnO_3$ phase that is a starting material. As a result, during charge and discharge at high voltage, a decrease in the $Li_2MeO_3$ phase contributing to the structural stability of the lithium metal oxide may decrease. Accordingly, since some Me are substituted with other elements, a decrease on the amount of $Li_2MeO_3$ phase during charge and discharge is suppressed and thus, the structural stability of the lithium metal oxide may increase.

A doping content of the metal (M') in the lithium metal oxide of Formula 1 may be in a range of about 0.5 to about 5 mole percent (mol %), based on a total number of moles of overlithiated lithium and metal. The doping content of the metal (M') may be indicated as z in Formula 1 and may satisfy 0.005≤z≤0.05. Within this range, a lithium battery including the lithium metal oxide may have improved high temperature cycle characteristics and high temperature stability. When z is too high, a reversible capacity of the lithium battery may decrease and when z is too low, an improvement in structural stability may be negligible.

Me may include a plurality of metals.

Me in the lithium metal oxide of Formula 1 may include Mn and at least one metal selected from V, Cr, Fe, Co, Ni, Al, and B. That is, Me may include Mn, and may additionally include at least one other metal. An amount of Mn may be in a range of about 20 to about 80 mol %, based on a total number of moles of $[Li_xMe_yM'_z]$ in the lithium metal oxide of Formula 1. That is, an amount of Mn may be in a range of about 20 to about 80 mol %, based on a total number of moles of overlithiated lithium, Me, and M'.

The lithium metal oxide in the cathode active material may also be represented by Formula 2:

Formula 2 wherein x+y+z=1; 0<x<0.33, 0≤z≤0.1; and 0≤d≤0.1, Me is at least one metal selected from Mn, V, Cr, Fe, Co, Ni, Al, and B, and M" is Sc, Y, or La.

A doping content of the metal (M") in the lithium metal oxide of Formula 2 may be in a range of about 0.5 to about 5 mol %, based on a total number of moles of the overlithiated lithium and metal, i.e., $[Li_xMe_yM''_z]$. The doping content of the metal (M") may be indicated as z in Formula 2 and may satisfy the condition of 0.005≤z≤0.05.

Me in the lithium metal oxide of Formula 2 may include Mn and at least one metal selected from V, Cr, Fe, Co, Ni, Al, and B. That is, Me may include Mn, and may additionally include at least one other metal. An amount of Mn may be in a range of about 20 to about 80 mol %, based on a total number of moles of $[Li_xMe_yM'_z]$ in the lithium metal oxide of Formula 2. That is, an amount of Mn may be in a range of about 20 to about 80 mol %, based on a total number of moles of overlithiated lithium, Me, and M".

The lithium metal oxide in the cathode active material may also be represented by Formula 3:

$$Li[Li_xNi_aCo_bMn_cM'_z]O_{(2+d)} \quad \text{Formula 3}$$

wherein x+a+b+c+z=1; 0<x<0.33, 0<z≤0.1, 0<a≤0.5, 0<b≤0.5, 0.2≤c≤0.8; and 0≤d≤0.1, and M' is Sc, Y, or La.

A doping content of the metal (M') in the lithium metal oxide of Formula 3 may be in a range of about 0.5 to about 5 mol %, based on a total number of moles of overlithiated lithium and metal, i.e., [Li$_x$Ni$_a$Co$_b$Mn$_c$M'$_z$]. The doping content of the metal (M') may be indicated as z in Formula 3 and may satisfy the inequality 0.005≤z≤0.05.

The lithium metal oxide in the cathode active material may also be represented by Formula 4:

$$Li[Li_xNi_aCo_bMn_cM'_z]O_{(2+d)} \quad \text{Formula 4}$$

wherein x+a+b+c+z=1; 0.1<x<0.2, 0<z≤0.1, 0<a≤0.3, 0<b≤0.3, 0.4≤c≤0.6; and 0≤d≤0.1, and M' is Sc, Y, or La.

A doping content of the metal (M') in the lithium metal oxide of Formula 4 may be in a range of about 0.5 to about 5 mol %, based on a total number of moles of overlithiated lithium and metal, i.e., [Li$_x$Ni$_a$Co$_b$Mn$_c$M'$_z$]. The doping content of the metal (M') may be indicated as z in Formula 4 and may satisfy 0.005≤z≤0.05.

The lithium metal oxide in the cathode active material may also be represented by any of Formulas 5 to 7:

$$Li[Li_xNi_aCo_bMn_cSc_z]O_{(2+d)} \quad \text{Formula 5}$$

$$Li[Li_xNi_aCo_bMn_cY_z]O_{(2+d)} \quad \text{Formula 6}$$

$$Li[Li_xNi_aCo_bMn_cLa_z]O_{(2+d)} \quad \text{Formula 7}$$

wherein x+a+b+c+z=1; 0.1<x<0.2, 0.005≤z≤0.1, 0<a≤0.3, 0<b≤0.3, 0.4≤c≤0.6; and 0≤d≤0.1. For example, z in Formulas 5 to 7 may satisfy 0.005≤z≤0.05.

An embodiment of a method of preparing a lithium metal oxide includes combining, e.g., mixing, a metal and/or a metal precursor to prepare a mixture, milling the mixture, and heat treating the milled mixture.

The metal precursor may include a precursor of lithium and other metals constituting the lithium metal oxide. The metal of the precursor may include other metals constituting the lithium metal oxide. The metal precursor is not limited and may be, a metal-containing salt, or a complex containing a metal and an organic ligand coordinated thereto, for example. A shape of the metal is not limited, and the metal may be, for example, metal powder.

An amount of the metal precursor according to the metal constituting the metal precursor may vary in consideration of a composition of an intended lithium metal oxide. The metal precursor may include a first metal precursor including at least one metal selected from Mn, V, Cr, Fe, Co, Ni, Al, and B; a second metal precursor and/or a second metal including at least one metal selected from Sc, Y, and La; and a lithium metal precursor. For example, the first metal precursor may be nickel hydroxide, cobalt hydroxide, or manganese carbonate. For example, the second metal precursor may be scandium acetylacetonate, yttrium chloride, or lanthanum isopropoxide. For example, the second metal may be scandium metal powder, yttrium metal powder, or lanthanum metal powder. For example, the lithium metal precursor may be lithium carbonate or the like.

The mixing of the metal and/or metal precursor to prepare a mixture and the milling of the mixture may be performed simultaneously in an inert gas atmosphere including, for example, argon. The milling may be performed by ball-milling, but the milling method is not limited thereto, and any one of various milling and mixing methods that are used in the art may be used herein.

The heat treating may be performed at a temperature of about 800° C. to about 1100° C. for 3 hours to 15 hours while dry air is flowing thereinto, and the heat treatment conditions may selected by one of skill in the art without undue experimentation. The heat treated lithium metal oxide may be dry-cooled in a furnace.

A cathode according to an embodiment may include the cathode active material.

For example, the cathode active material, a conductive material, a binding agent, and a solvent may be mixed to prepare a cathode active material composition. The cathode active material composition may be directly coated on an aluminum current collector and dried to form a cathode plate including a cathode active material layer. According to another embodiment, the cathode active material composition may be cast on a separate support, and then a film exfoliated from the support may be laminated on the aluminum current collector to prepare a cathode plate including a cathode active material layer.

Examples of the conductive material are carbon black, graphite particulate, natural graphite, artificial graphite, acetylene black, ketjen black, carbon fiber; carbon nanotube; metal powder or metal fiber or metal tube, such as copper, nickel, aluminum, or silver; and a conductive polymer, such as polyphenylene derivative, but the conductive material is not limited thereto and may be any suitable conductive material that is used in the art.

As the binding agent, a vinylidene fluoride/hexafluoropropylene copolymer, polyvinylidenefluoride, polyacrylonitrile, polymethylmetacrylate, polytetrafluoroethylene ("PTFE"), a combination thereof, or a styrene butadiene rubber-based polymer may be used, and as a solvent, e.g., N-methylpyrrolidone ("NMP"), acetone, water, or the like may be used, and the solvent is not limited thereto.

In some cases, a plasticizer may be further added to the cathode active material composition to form pores in an electrode plate.

Amounts of the cathode active material, the conductive material, the binding agent, and the solvent may be at a level suitable for a lithium battery. According to the purpose and structure of a lithium battery, at least one of the conductive material, the binding agent, and the solvent may be omitted.

In addition, the cathode may further include, in addition to the cathode active material doped with the metal (M'), another cathode active material.

For use as the other cathode active material, any suitable lithium-containing metal oxide that are used in the art may be used. For example, at least one composite oxide of lithium and metal selected from cobalt, manganese, nickel, and a combination thereof may be used, and an example of the composite oxide is represented by at least one selected from Li$_a$A$_{1-b}$B$_b$D$_2$ (wherein 0.90≤a≤1, and 0≤b≤0.5); Li$_a$E$_{1-b}$B$_b$O$_{2-c}$D$_c$ (wherein 0.90≤a≤1, 0≤b≤0.5, and 0≤c≤0.05); LiE$_{2-b}$B$_b$O$_{4-c}$D$_c$(wherein 0≤b≤0.5, and 0≤c≤0.05); Li$_a$Ni$_{1-b-c}$Co$_b$B$_c$D$_\alpha$ (wherein 0.90≤a≤1, 0≤b≤0.5, 0≤c≤0.05, and 0<α≤2); Li$_a$Ni$_{1-b-c}$Co$_b$B$_c$O$_{2-\alpha}$F$_\alpha$ (wherein 0.90≤a≤1, 0≤b≤0.5, 0≤c≤0.05, and 0<α<2); Li$_a$Ni$_{1-b-c}$Co$_b$B$_c$O$_{2-\alpha}$F$_\alpha$ (wherein 0.90≤a≤1, 0≤b≤0.5, 0≤c≤0.05, and 0<α<2); Li$_a$Ni$_{1-b-c}$Mn$_b$B$_c$D$_\alpha$ (wherein 0.90≤a≤1, 0≤b≤0.5, 0≤c≤0.05, and 0<α≤2); Li$_a$Ni$_{1-b-c}$Mn$_b$B$_c$O$_{2-\alpha}$F$_\alpha$ (wherein 0.90≤a≤1, 0≤b≤0.5, 0≤c≤0.05, and 0<α<2); Li$_a$Ni$_{1-b-c}$Mn$_b$B$_c$O$_{2-\alpha}$F$_2$ (wherein 0.90≤a≤1, 0≤b≤0.5, 0≤c≤0.05, and 0<α<2); Li$_a$Ni$_{1-b-c}$Mn$_b$O$_2$ (wherein 0.90≤a≤1, 0≤b≤0.9, 0≤c≤0.5, and 0.001≤d≤0.1); Li$_a$Ni$_b$Co$_c$Mn$_d$GeO$_2$ (wherein 0.90≤a≤1, $0 \le b \le 0.9$, $0 \le c \le 0.5$, $0 \le d \le 0.5$, and $0.001 \le e \le 0.1$); $Li_aNiG_bO_2$ (wherein $0.90 \le a \le 1$, and $0.001 \le b \le 0.1$); $Li_aCoG_bO_2$ (wherein $0.90 \le a \le 1$, and $0.001 \le b \le 0.1$); $Li_aMnG_bO_2$ (wherein $0.90 \le a \le 1$, and $0.001 \le b \le 0.1$); $Li_aMn_2G_bO_4$ (wherein $0.90 \le a \le 1$, and $0.001 \le b \le 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); and $LiFePO_4$: wherein A is at least one selected from Ni, Co, and Mn; B is at least one selected from Al, Ni, Co, Mn, Cr, Fe, Mg, Sr, V, and a rare-earth element; D is at least one selected from O, F, S, and P; E is at least one selected from Co and Mn; F is at least one selected from F, S, and P; G is at least one selected from Al, Cr, Mn, Fe, Mg, La, Ce, Sr, and V; Q is at least one selected from Ti, Mo, and Mn; I is at least one selected from Cr, V, Fe, Sc, and Y; and J is at least one selected from V, Cr, Mn, Co, Ni, and Cu.

For example, $LiCoO_2$, $LiMn_xO_{2x}$ (x=1, 2), $LiNi_{1-x}Mn_xO_{2x}$ (0<x<1), $LiNi_{1-x-y}Co_xMn_yO_2$ ($0 \le x \le 0.5$, $0 \le y \le 0.5$), $LiFePO_4$ or the like may be used.

These compounds may have a coating layer on their surfaces, or these compounds may be mixed with a compound having a coating layer. The coating layer may include an oxide of a coating element, a hydroxide of a coating element, an oxyhydroxide of a coating element, an oxycarbonate of a coating element, or a hydroxycarbonate of a coating element. These compounds that form the coating layer may be amorphous or crystalline. As a coating element included in the coating layer, at least one selected from Mg, Al, Co, K, Na, Ca, Si, Ti, V, Sn, Ge, Ga, B, As, and Zr may be used. The coating layer may be formed by using any suitable coating method that is performed using the compounds and the elements and do not adversely affect desirable properties of the cathode active material (For example, spray coating, immersion, or the like). These coating methods are obvious to one of ordinary skill in the art and thus, are not described in detail herein.

A lithium battery according to an embodiment includes a cathode including the cathode active material. The lithium battery may be manufactured by using the following method.

First, a cathode is manufactured by using the cathode manufacturing method described above.

Then, an anode may be manufactured by using the following manner. The anode may be manufactured in the same manner as used to manufacture the cathode, except that an anode active material is used instead of a cathode active material. In addition, a conductive material, a binding agent, and a solvent used in an anode active material composition may be the same as those used in the cathode.

For example, an anode active material, a conductive material, a binding agent, and a solvent are mixed to prepare an anode active material composition, and the anode active material composition may be directly coated on a copper current collector to manufacture an anode plate. According to another embodiment, the anode active material composition may be is cast on a separate support, and an anode active material film exfoliated from the support is laminated on a copper current collector to manufacture an anode plate.

In addition, the anode active material may be any one of various materials that are used as an anode active material for a lithium battery in the art. For example, the anode active material may include at least one selected from lithium metal, lithium-alloyable metal, transition metal oxide, non-transition metal oxide, and a carbonaceous material.

For example, the lithium-alloyable metal may be at least one selected from Si, Sn, Al, Ge, Pb, Bi, Sb, a Si—Y alloy (where Y is alkali metal, alkali earth metal, a Group 13 element, a Group 14 element, transition metal, and a rare-earth element, wherein Y is not Si), or a Sn—Y alloy (Y is at least one selected from an alkali metal, alkali earth metal, a Group 13 element, a Group 14 element, transition metal, and a rare-earth element, and Y is not Sn). The element Y may be at least one selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, and Po.

For example, the transition metal oxide may be at least one selected from lithium titanium oxide, vanadium oxide, and lithium vanadium oxide.

For example, the non-transition metal oxide may be at least one selected from $SnO_2$, and $SiO_x$ (0<x<2), and the like.

The carbonaceous material may be at least one selected from a crystalline carbon and an amorphous carbon. The crystalline carbon may be a natural or artificial graphite that is amorphous, tabular, flake, circular, or fibrous, and the amorphous carbon may be soft carbon (cold calcined carbon) or hard carbon, meso-phase pitch carbide, or calcined cork.

Amounts of the anode active material, the conductive material, the binding agent, and the solvent may be at a level suitable for use in a lithium battery.

Then, a separator which is to be inserted between the cathode and the anode is prepared. As a separator, any suitable material that is used in a lithium battery may be used. For example, the separator may have a low resistance to movement of electrolytic ions and excellent electrolyte-retaining capabilities. For example, at least one selected from glass fiber, polyester, Teflon, polyethylene, polypropyplene, and polytetrafluoroethylene ("PTFE", each of which may be in a woven- or non-woven form, may be used. In detail, a separator for a lithium ion battery may be a rollable separator formed of polyethylene or polypropylene, and a separator for a lithium ion polymer battery may be a separator having excellent organic electrolyte-retaining capabilities. For example, these separators may be prepared by using the following method.

A separator composition is prepared by mixing a polymer resin, a filler, and a solvent. The separator composition may be directly coated or dried on an electrode to complete the formation of the separator. Alternatively, the separator composition may be cast on a separate support and then a film separated from the support is laminated on an electrode, thereby completing the formation of the separator.

A polymer resin used in preparing the separator may not be particularly limited, and all the materials used for a binding agent of an electrode plate may be used. For example, at least on selected from a vinylidene fluoride/hexafluoropropylene copolymer, polyvinylidenefluoride ("PVDF"), polyacrylonitrile, and polymethylmetacrylate may be used.

Then, an electrolyte is prepared.

For example, the electrolyte may be an organic electrolytic solution. According to an embodiment, the electrolyte may be solid. For example, boron oxide, lithiumoxynitrite, or the like may be used, but the electrolyte may not be limited thereto, and the electrolyte may be any one of various materials that are used as a solid electrolyte in the art. The solid electrolyte may be formed on an anode by, for example, sputtering.

For example, an organic electrolytic solution may be prepared. The organic electrolytic solution may be prepared by dissolving a lithium slat in an organic solvent.

The organic solvent may be any one of various materials that are used as an organic solvent in the art. For example, the organic solvent may comprise at least one selected from propylene carbonate, ethylene carbonate, fluoro ethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofurane, γ-butyrolactone, dioxolane, 4-methyldioxolane, N,N-dimethylformamide, dimethylacetamide, dimethylsulfoxide, dioxane, 1,2-dimethoxyethane, sulforane, dichloroethane, chlorobenzene, nitrobenzene, diethyleneglycol, and dimethylether.

The lithium salt may be any suitable lithium salt used in the art. For example, the lithium salt may comprise at least one selected from $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are natural numbers), LiCl, and LiI.

Figure 4:
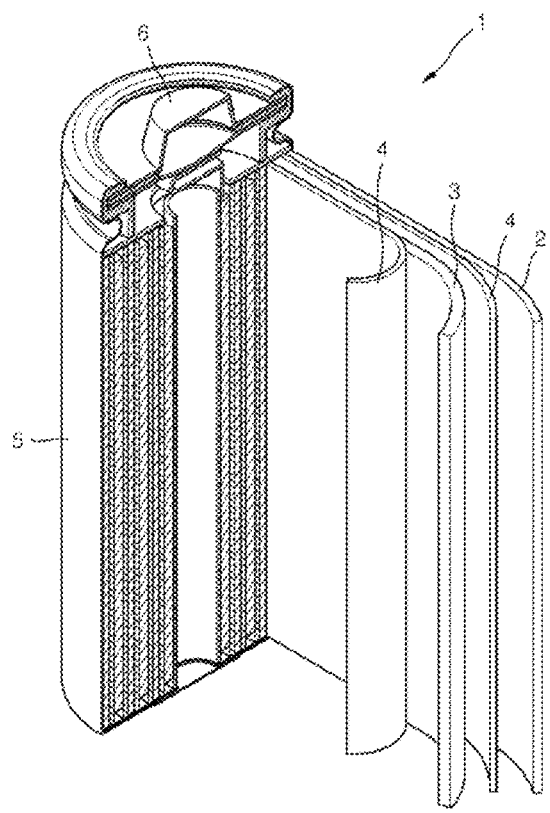
FIG. 4 is a schematic view of an embodiment of a lithium battery.

As shown in FIG. 4, a lithium battery 1 includes a cathode 3, an anode 2, and a separator 4. The cathode 3, the anode 2, and the separator 4 are wound or folded to be placed in a battery case 5. Then, an organic electrolytic solution is injected to the battery case 5, and then sealed with a cap assembly 6 to complete the manufacturing of the lithium battery 1. The battery case 5 may be a circular case, a rectangular case, or a thin-film type case. For example, the lithium battery may be a large thin film-type battery. The lithium battery may be a lithium ion battery.

The separator 4 may be disposed between the cathode 3 and the anode 2 to complete the manufacturing of a battery assembly. When battery assemblies are stacked in a bi-cell structure, and the resulting structure is immersed in an organic electrolytic solution, and the obtained resulting structure is housed in a pouch, followed by being sealed to complete the manufacturing of a lithium ion polymer battery.

In addition, battery assemblies are stacked to form a battery pack, and the battery pack may be used in various applications requiring high capacity and high performance. For example, the battery pack may be used in a notebook, a smart phone, an electric vehicle, or the like.

In addition, the lithium battery may be used in an electric vehicle ("EV") due to its lifetime characteristics and high-rate characteristics. For example, the lithium battery may be used in plug-in hybrid electric vehicles ("PHEV"s). In addition, the lithium battery may be used in applications requiring a great amount of electric power. For example, the lithium battery may be used in an electric bicycle, an electric tool, or the like.

Hereinafter, embodiments are described in detail with reference to Examples and Comparative Examples. However, Examples are presented herein for illustrative purpose only, and do not limit the scope of this disclosure.

EXAMPLES (Preparation of Cathode Active Material)

Comparative Example 1

Preparation of $Li[Li_{0.167}Ni_{0.125}Co_{0.25}Mn_{0.458}]O_2$

A lithium hydroxide, a nickel hydroxide, a cobalt hydroxide, and a manganese carbonate were used as starting materials.

To prepare 0.03 mole $Li[Li_{0.167}Ni_{0.125}Co_{0.25}Mn_{0.458}]O_2$, a molar ratio of Li, Ni, Co, and Mn was calculated and the starting materials were prepared corresponding to the molar ratio.

The starting materials were placed in a milling vessel in an argon atmosphere and mixed and milled for 3 hours. The milled compound was placed in a furnace, and heat treated at a temperature of 900° C. for 10 hours while dry air was supplied thereto to prepare a cathode active material. The cathode active material was cooled in the furnace.

Example 1

Preparation of $Li[Li_{0.167}(Ni_{0.125}Co_{0.25}Mn_{0.458})_{1-p}La_p]O_2$ (p=0.005)

0.03 mol $Li[Li_{0.167}(Ni_{0.125}Co_{0.25}Mn_{0.458})_{1-p}La_p]O_2$ (p=0.005) was prepared in the same manner as in Comparative Example 1, except that the molar ratio of Li, Ni, Co, Mn, and La was amended and the starting materials were prepared correspondingly. As a starting material for La, lanthanum metal powder was used. A doping content of La was 0.5 mol %.

Example 2

Preparation of $Li[Li_{0.167}(Ni_{0.125}Co_{0.25}Mn_{0.458})_{1-p}La_p]O_2$ (p=0.01)

0.03 mol $Li[Li_{0.167}(Ni_{0.125}Co_{0.25}Mn_{0.458})_{1-p}La_p]O_2$ (p=0.01) was prepared in the same manner as in Comparative Example 1, except that the molar ratio of Li, Ni, Co, Mn, and La was amended and the starting materials were prepared correspondingly. As a starting material for La, lanthanum metal powder was used. A doping content of La was 1 mol %.

Example 3

Preparation of $Li[Li_{0.167}(Ni_{0.125}Co_{0.25}Mn_{0.458})_{1-p}La_p]O_2$ (p=0.02)

0.03 mol $Li[Li_{0.167}(Ni_{0.125}Co_{0.25}Mn_{0.458})_{1-p}La_p]O_2$ (p=0.02) was prepared in the same manner as in Comparative Example 1, except that the molar ratio of Li, Ni, Co, Mn, and La was amended and the starting materials were prepared correspondingly. As a starting material for La, lanthanum metal powder was used. A doping content of La was 2 mol %.

Example 4

Preparation of $Li[Li_{0.167}(Ni_{0.125}Co_{0.25}Mn_{0.458})_{1-p}La_p]O_2$ (p=0.05)

0.03 mol $Li[Li_{0.167}(Ni_{0.125}Co_{0.25}Mn_{0.458})_{1-p}La_p]O_2$ (p=0.05) was prepared in the same manner as in Comparative Example 1, except that the molar ratio of Li, Ni, Co, Mn, and La was amended and the starting materials were prepared correspondingly. As a starting material for La, lanthanum metal powder was used. A doping content of La was 5 mol %.

Example 5

Preparation of $Li[Li_{0.167}(Ni_{0.125}Co_{0.25}Mn_{0.458})_{1-p}La_p]O_2$ (p=0.1)

0.03 mol $Li[Li_{0.167}(Ni_{0.125}Co_{0.25}Mn_{0.458})_{1-p}La_p]O_2$ (p=0.1) was prepared in the same manner as in Comparative Example 1, except that the molar ratio of Li, Ni, Co, Mn, and La was amended and the starting materials were prepared correspondingly. As a starting material for La, lanthanum metal powder was used. A doping content of La was 10 mol %.

Example 6

Preparation of $Li[Li_{0.167}(Ni_{0.125}Co_{0.25}Mn_{0.458})_{1-p}Sc_p]O_2$ (p=0.005)

0.03 mol $Li[Li_{0.167}(Ni_{0.125}Co_{0.25}Mn_{0.458})_{1-p}Sc_p]O_2$ (p=0.005) was prepared in the same manner as in Comparative Example 1, except that the molar ratio of Li, Ni, Co, Mn, and Sc was amended and the starting materials were prepared correspondingly. As a starting material for Sc, Scandium metal powder was used. A doping content of Sc was 0.5 mol %.

Example 7

Preparation of $Li[Li_{0.167}(Ni_{0.125}Co_{0.25}Mn_{0.458})_{1-p}Sc_p]O_2$ (p=0.01)

0.03 mol $Li[Li_{0.167}(Ni_{0.125}Co_{0.25}Mn_{0.458})_{1-p}Sc_p]O_2$ (p=0.01) was prepared in the same manner as in Comparative Example 1, except that the molar ratio of Li, Ni, Co, Mn, and Sc was amended and the starting materials were prepared correspondingly. As a starting material for Sc, Scandium metal powder was used. A doping content of Sc was 1 mol %.

Example 8

Preparation of $Li[Li_{0.167}(Ni_{0.125}Co_{0.25}Mn_{0.458})_{1-p}Sc_p]O_2$ (p=0.02)

0.03 mol $Li[Li_{0.167}(Ni_{0.125}Co_{0.25}Mn_{0.458})_{1-p}Sc_p]O_2$ (p=0.02) was prepared in the same manner as in Comparative Example 1, except that the molar ratio of Li, Ni, Co, Mn, and Sc was amended and the starting materials were prepared correspondingly. As a starting material for Sc, Scandium metal powder was used. A doping content of Sc was 2 mol %.

Example 9

Preparation of $Li[Li_{0.167}(Ni_{0.125}Co_{0.25}Mn_{0.458})_{1-p}Sc_p]O_2$ (p=0.05)

0.03 mol $Li[Li_{0.167}(Ni_{0.125}Co_{0.25}Mn_{0.458})_{1-p}Sc_p]O_2$ (p=0.05) was prepared in the same manner as in Comparative Example 1, except that the molar ratio of Li, Ni, Co, Mn, and Sc was amended and the starting materials were prepared correspondingly. As a starting material for Sc, Scandium metal powder was used. A doping content of Sc was 5 mol %.

Example 10

Preparation of $Li[Li_{0.167}(Ni_{0.125}Co_{0.25}Mn_{0.458})_{1-p}Sc_p]O_2$ (p=0.1)

0.03 mol $Li[Li_{0.167}(Ni_{0.125}Co_{0.25}Mn_{0.458})_{1-p}Sc_p]O_2$ (p=0.1) was prepared in the same manner as in Comparative Example 1, except that the molar ratio of Li, Ni, Co, Mn, and Sc was amended and the starting materials were prepared correspondingly. As a starting material for Sc, Scandium metal powder was used. A doping content of Sc was 10 mol %.

Example 11

Preparation of $Li[Li_{0.167}(Ni_{0.125}Co_{0.25}Mn_{0.458})_{1-p}Y_p]O_2$ (p=0.005)

0.03 mol $Li[Li_{0.167}(Ni_{0.125}Co_{0.25}Mn_{0.458})_{1-p}Y_p]O_2$ (p=0.005) was prepared in the same manner as in Comparative Example 1, except that the molar ratio of Li, Ni, Co, Mn, and Y (yttrium) was amended and the starting materials were prepared correspondingly. As a starting material for Y (yttrium), yttrium metal power was used. A doping content of Y (yttrium) was 0.5 mol %.

Example 12

Preparation of $Li[Li_{0.167}(Ni_{0.125}Co_{0.25}Mn_{0.458})_{1-p}Y_p]O_2$ (p=0.01)

0.03 mol $Li[Li_{0.167}(Ni_{0.125}Co_{0.25}Mn_{0.458})_{1-p}Y_p]O_2$ (p=0.01) was prepared in the same manner as in Comparative Example 1, except that the molar ratio of Li, Ni, Co, Mn, and Y (yttrium) was amended and the starting materials were prepared correspondingly. As a starting material for Y (yttrium), yttrium metal power was used. A doping content of Y (yttrium) was 1 mol %.

Example 13

Preparation of $Li[Li_{0.167}(Ni_{0.125}Co_{0.25}Mn_{0.458})_{1-p}Y_p]O_2$ (p=0.02)

0.03 mol $Li[Li_{0.167}(Ni_{0.125}Co_{0.25}Mn_{0.458})_{1-p}Y_p]O_2$ (p=0.02) was prepared in the same manner as in Comparative Example 1, except that the molar ratio of Li, Ni, Co, Mn, and Y (yttrium) was amended and the starting materials were prepared correspondingly. As a starting material for Y (yttrium), yttrium metal power was used. A doping content of Y (yttrium) was 2 mol %.

Example 14

Preparation of $Li[Li_{0.167}(Ni_{0.125}Co_{0.25}Mn_{0.458})_{1-p}Y_p]O_2$ (p=0.05)

0.03 mol $Li[Li_{0.167}(Ni_{0.125}Co_{0.25}Mn_{0.458})_{1-p}Y_p]O_2$ (p=0.05) was prepared in the same manner as in Comparative Example 1, except that the molar ratio of Li, Ni, Co, Mn, and Y (yttrium) was amended and the starting materials were prepared correspondingly. As a starting material for Y (yttrium), yttrium metal power was used. A doping content of Y (yttrium) was 5 mol %.

Example 15

Preparation of $Li[Li_{0.167}(Ni_{0.125}Co_{0.25}Mn_{0.458})_{1-p}Y_p]O_2$ (p=0.1)

0.03 mol $Li[Li_{0.167}(Ni_{0.125}Co_{0.25}Mn_{0.458})_{1-p}Y_p]O_2$ (p=0.1) was prepared in the same manner as in Comparative Example 1, except that the molar ratio of Li, Ni, Co, Mn, and Y (yttrium) was amended and the starting materials were prepared correspondingly. As a starting material for Y (yttrium), yttrium metal power was used. A doping content of Y (yttrium) was 1 mol %.

(Preparation of Cathode and Lithium Battery)

Example 16

The cathode active material powder synthesized in Example 1 and a carbon conductive material (carbon black, Super P Li®, Timcal Graphite & Carbon) were uniformly mixed at a weight ratio of 85:7.5, and then a pyrrolidone solution including a polyvinylidene fluoride (PVDF) binder was added thereto, preparing slurry in which a weight ratio of active material:carbon conductive material:binder is 85:7.5:7.5.

The active material slurry was coated on an aluminum foil by using a doctor blade, and dried, and then dried at a temperature of 150° C. to manufacture a cathode plate. The cathode plate was pressed to form a sheet form.

The cathode plate was used to manufacture a Cell Fixture having a diameter of 15 mm.

In manufacturing a cell, metal lithium was used as a counter electrode, and as an electrolyte, 1.3M $LiPF_6$ dissolved in a mixed solvent of ethylenecarbonate (EC): ethylmethylcarbonate (EMC) (a volume ratio of 1:2) was used.

Examples 17 to 30

Lithium batteries were manufactured in the same manner as in Example 16, except that the cathode active materials synthesized in Examples 2-15 were respectively used.

Comparative Example 2

A lithium battery was manufactured in the same manner as in Example 16, except that the cathode active material synthesized in Comparative Example 1 was used.

Evaluation Example 1

Confirmation of Presence of $Li_2MnO_3$ Phase

The coin cells manufactured according to Comparative Example 2, Example 18 and Example 23 were charged with a constant current at a temperature of 25° C. at 0.1 C rate until a voltage reached 4.7V (vs. Li), the cells were charged at a constant voltage until the current reached 0.05 C. Subsequently, until the voltage reached 2.5V (vs. Li), the cells were discharged with a constant current of 0.1 C. This is one cycle.

Figure 2:
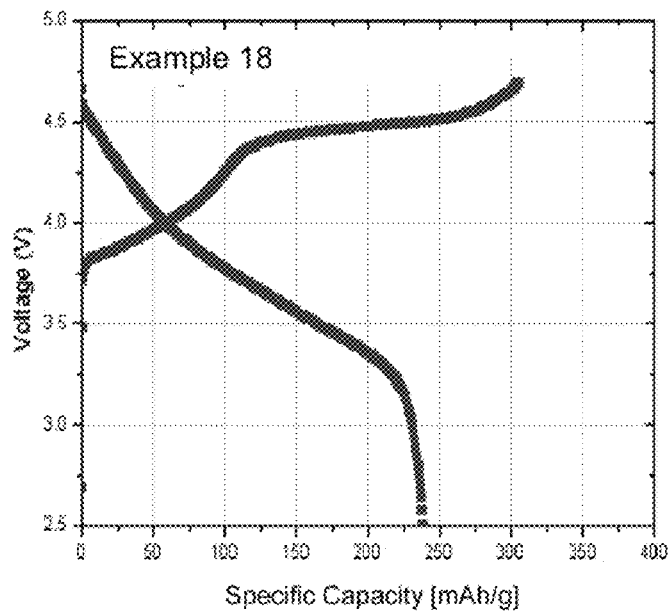
FIG. 2 is a graph of voltage (Volts, V) versus specific capacity (millampere-hours per gram, mAh/g) and shows a charging and discharging curve of a lithium battery of Example 18 in a $1^{st}$ cycle.
Figure 3:
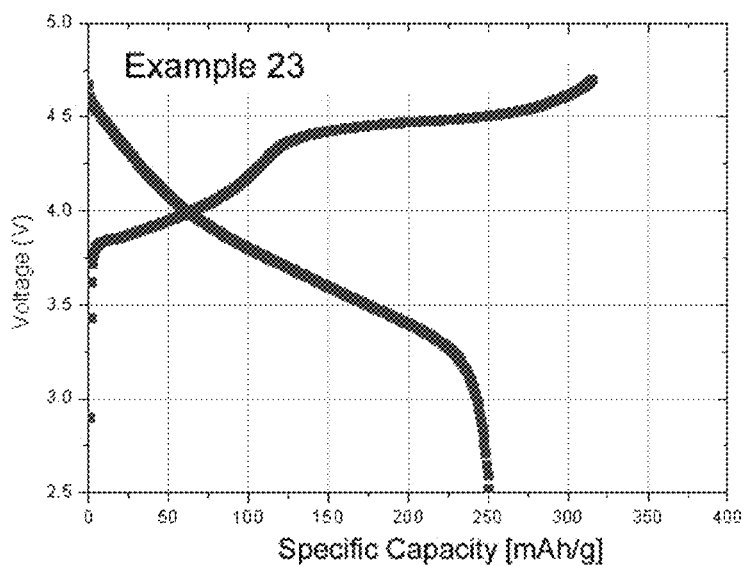
FIG. 3 is a graph of voltage (Volts, V) versus specific capacity (millampere-hours per gram, mAh/g) and shows a charging and discharging curve of a lithium battery of Example 23 in a $1^{st}$ cycle.

Charging and discharging curves of the lithium batteries of Comparative Example 2, Example 18, and Example 23 in $1^{st}$ cycle are shown in FIGS. 1 to 3. Referring to FIGS. 1 to 3, at a voltage of 4.4V or more, a plateau portion appeared due to $Li_2MnO_3$, and a discharging capacity was almost 250 mAh/g, which is a theoretic capacity.

Evaluation Example 2

Lifetime Characteristics Evaluation

The coin cells manufactured according to Examples 16 to 30 and Comparative Example 2 were charged with a constant current at a temperature of 25° C. at 0.2 C rate until a voltage reached 4.6V (vs. Li), and then while the voltage was maintained at 4.6V, the cells were charged at a constant voltage until the current reached 0.05 C. Subsequently, until the voltage reached 2.5V (vs. Li), the cells were discharged with a constant current of 0.1 C. This charging and discharging cycle was performed with a constant current of 0.5 C 50 times.

Some of the charging and discharging test results are shown in Table 1.

A voltage drop of discharging voltage and a capacity retention rate are shown in Equations 1 and 2. An initial discharging capacity is a discharging capacity in the first cycle.

Discharging voltage drop [mV]=[average discharging voltage in $1^{th}$ cycle−average discharging voltage in $50^{st}$ cycle]  Equation 1

The average discharging voltage is a discharging voltage corresponding to a middle value of a discharging capacity in each cycle.

Capacity retention rate[%]=[discharging capacity in $50^{th}$ cycle/discharging capacity in $1^{st}$ cycle]×100  Equation 2

TABLE 1

|  | Discharging voltage drop in $50^{th}$ cycle [mV] | Capacity retention rate in $50^{th}$ cycle [%] |
| --- | --- | --- |
| Comparative Example 2 | 337 | 77.5 |
| Example 16 | 166 | 81.4 |
| Example 17 | 155.4 | 83.2 |
| Example 18 | 182.0 | 82.5 |
| Example 19 | 281.3 | 88.0 |
| Example 20 | 279.3 | 83.3 |
| Example 21 | 164.7 | 82.7 |
| Example 22 | 218.7 | 83.8 |
| Example 23 | 236.4 | 84.4 |
| Example 24 | 246.4 | 85.0 |
| Example 25 | 270.5 | 88.2 |

As shown in Table 1, the lithium batteries of Examples 16 to 25 had an initial discharging capacity that is similar to that of the lithium battery of Comparative Example 2.

In particular, compared to the lithium battery of Comparative Example 2, the lithium batteries of Examples 16 to 25 have less reduced discharging voltages and improved lifetime characteristics.

Evaluation Example 2

High-Rate Charging and Discharging Test

The coin cells manufactured according to Example 16 to 30 and Comparative Example 2 were charged with a constant current at a temperature of 25° C. at 0.2 C rate until a voltage reached 4.6V (vs. Li), and then while the voltage was maintained at 4.6V, the coin cells were charged at a constant voltage until the current reached 0.05 C. Subsequently, the coin cells were discharged while a current density increased until a voltage reached 2.0V (vs. Li). The charging and discharging cycle was repeated and a current density during discharging was gradually increased. The current density during discharging was 0.2 C and 2 C rate. High-rate characteristics are indicated as a discharging capacity ratio (rate capability, 2 C/0.2 C) of Equation 3. The high-rate charging and discharging test results are shown in Table 2.

Discharging capacity ratio[%]=[discharging capacity at 2 C rate(2th cycle)/discharging capacity at 0.2 C rate(1th cycle)]×100  Equation 3

TABLE 2

|  | 0.2 C discharging capacity [mAh/g] | Discharging capacity ratio[%] |
| --- | --- | --- |
| Comparative Example 2 | 221.6 | 80.0 |
| Example 16 | 215.4 | 79.6 |
| Example 17 | 210.5 | 80.8 |

TABLE 2-continued

|  | 0.2 C discharging capacity [mAh/g] | Discharging capacity ratio[%] |
|---|---|---|
| Example 18 | 211.0 | 82.3 |
| Example 19 | 195.9 | 79.2 |
| Example 20 | 160.0 | 77.7 |
| Example 21 | 227.5 | 81.1 |
| Example 22 | 228.8 | 81.9 |
| Example 23 | 223.3 | 81.7 |
| Example 24 | 229.8 | 81.0 |
| Example 25 | 220.1 | 78.8 |

As shown in Table 2, the lithium batteries of Examples 16 to 25 had high-rate characteristics that are similar to the lithium battery of Comparative Example 2.

As described above, according to the one or more of the above embodiments, According to an embodiment, due to the inclusion of a cathode active material substituted with a heteroatom, a lithium battery may prevent a decrease in discharging voltage and improve lifetime characteristics.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A cathode active material comprising a lithium metal oxide represented by Formula 1:

$$Li[Li_xMe_yM'_z]O_{(2+d)} \quad \text{Formula 1}$$

wherein $x+y+z=1$, $0<x<0.33$, $0<z\leq0.1$, and $0\leq d\leq0.1$,

Me is at least one metal selected from Mn, V, Cr, Fe, Co, Ni, Al and B, and

M' is [at least one metal selected from] Sc[, and Y].

2. The cathode active material of claim 1, wherein z satisfies the inequality $0.005\leq z\leq 0.05$.

3. The cathode active material of claim 1, wherein Me comprises:
at least one metal selected from V, Cr, Fe, Co, Ni, Al, and B; and
Mn.

4. The cathode active material of claim 1, wherein an amount of Mn is in a range of about 20 to about 80 mole percent, based on a total number of moles of $[Li_xMe_yM'_z]$ in the lithium metal oxide of Formula 1.

5. The cathode active material of claim 1, wherein the lithium metal oxide is represented by Formula 3:

$$Li[Li_xNi_aCo_bMn_cM'_z]O_{(2+d)} \quad \text{Formula 3}$$

wherein $x+a+b+c+z=1$, $0<x<0.33$, $0<z\leq0.1$, $0<a\leq0.5$, $0<b\leq0.5$, $0.2\leq c\leq0.8$, and $0\leq d\leq0.1$, and M' is Sc [or Y].

6. The cathode active material of claim 5, wherein z satisfies the inequality $0.005\leq z\leq0.05$.

7. The cathode active material of claim 1, wherein the lithium metal oxide is represented by Formula 4:

$$Li[Li_xNi_aCo_bMn_cM'_z]O_{(2+d)} \quad \text{Formula 4}$$

wherein $x+a+b+c+z=1$, $0.1<x<0.2$, $0<z\leq0.1$, $0<a\leq0.3$, $0<b\leq0.3$, $0.4\leq c\leq0.6$, and $0\leq d\leq0.1$, and M' is Sc [or Y].

8. The cathode active material of claim 7, wherein z satisfies the condition of $0.005\leq z\leq0.05$.

9. The cathode active material of claim 1, wherein the lithium metal oxide is represented by Formula 5:

$$Li[Li_xNi_aCo_bMn_cSc_z]O_{(2+d)} \quad \text{Formula 5}$$

wherein $x+a+b+c+z=1$, $0.1<x<0.2$, $0.005\leq z\leq0.1$, $0<a\leq0.3$, $0<b\leq0.3$, $0.4\leq c\leq0.6$, and $0\leq d\leq0.1$.

10. A cathode comprising the cathode active material of claim 1.

11. A lithium battery comprising the cathode of claim 10.

* * * * *